United States Patent [19]

Arai

[11] 4,287,669

[45] Sep. 8, 1981

[54] GLASS CUTTER

[76] Inventor: Toshimitsu Arai, 27, 8-chome, Anryu-machi, Sumiyoshi-ku, Osaka-shi, Japan

[21] Appl. No.: 157,835

[22] Filed: Jun. 9, 1980

[51] Int. Cl.³ .............................................. C03B 33/12
[52] U.S. Cl. ................................. 30/123.3; 30/164.95
[58] Field of Search ........................... 30/123.3, 164.95

[56] References Cited

U.S. PATENT DOCUMENTS

| | | | |
|---|---|---|---|
| 778,023 | 12/1904 | Fells | 30/123.3 |
| 989,603 | 4/1911 | Hornig | 30/123.3 |
| 1,606,802 | 11/1926 | Kurtz | 30/123.3 |
| 2,042,965 | 6/1936 | Rivard | 30/123.3 |
| 4,110,907 | 9/1978 | Einhorn | 30/164.95 |

Primary Examiner—Jimmy C. Peters
Attorney, Agent, or Firm—Wenderoth, Lind & Ponack

[57] ABSTRACT

A glass cutter including a barrel and a cutter head coaxially provided at the lower end of the barrel. The barrel and the cutter head is hollow along the axial length to accommodate therein a tube. The tube immovably fits within the cylindrical hollow formed in the barrel but is axially movable along the cylindrical hollow formed in the cutter head. A cutting oil reservoir is provided above the tube, from which the cutting oil is supplied to the cutting blade.

4 Claims, 3 Drawing Figures

GLASS CUTTER

The present invention relates to a glass cutter.

Conventionally, for cutting plate glass, especially thick one, a brush is dipped in cutting oil and then the line along which to cut the plate glass is traced with the brush so that the line may be smeared with cutting oil before the line is traced with a glass cutter. This procedure takes a great deal of trouble and is inefficient.

It is an object of the present invention to provide a glass cutter which obviates the above-described disadvantage.

It is another object of the present invention to provide a glass cutter in which the cutting blade is automatically supplied with cutting oil at the time of cutting operation so that the trouble of tracing the line with a brush prior to the cutting operation may be saved, thereby increasing efficiency.

It is a further object of the present invention to provide a glass cutter in which the cutting blade is supplied with cutting oil only at the time of cutting operation so that the cutting oil may not be wasted while the glass cutter is out of use.

It is still another object of the present invention to provide a glass cutter in which the rate of flow of cutting oil through the lower end of the wick can be easily adjusted so that the cutting blade may be supplied with an optimum amount of cutting oil.

With these objects in view and as will become apparent from the following detailed description, the present invention will be more clearly understood in connection with the accompanying drawings, in which.

Figure 3:
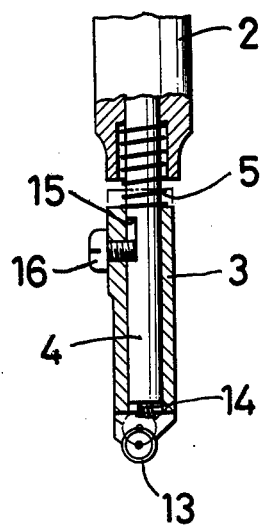
FIG. 3 is an enlarged sectional side elevation of a part thereof.
Figure 1:
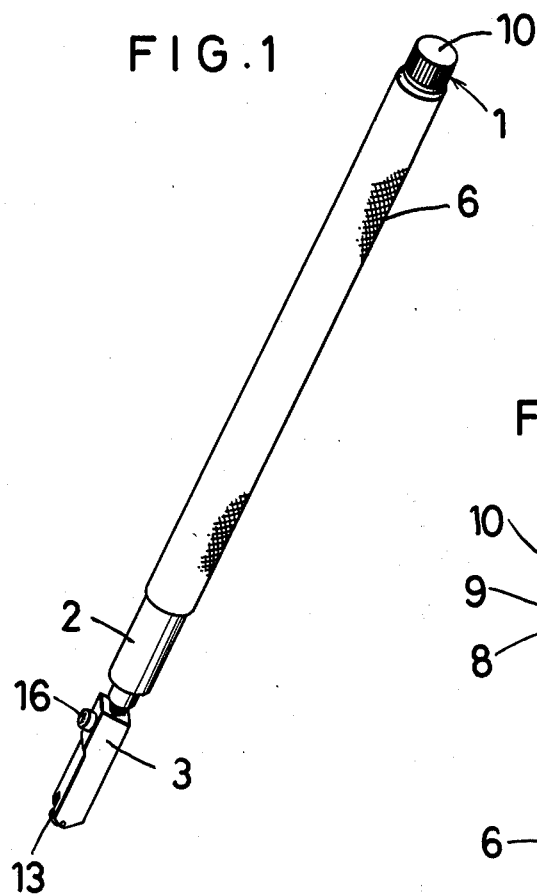
FIG. 1 is a perspective view of a glass cutter according to the present invention.
Figure 2:
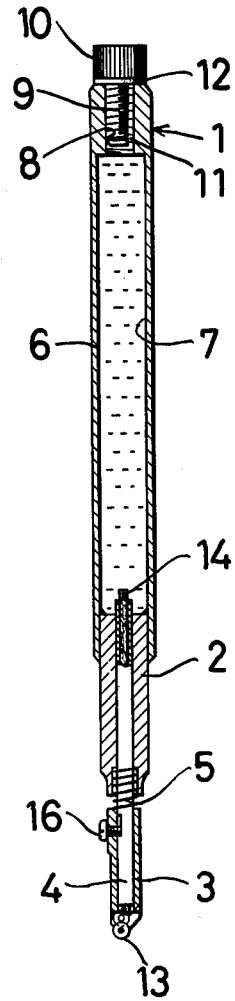
FIG. 2 is a longitudinal sectional view thereof.

Referring now to the drawings, a glass cutter 1 is accordance with the present invention includes a tubular barrel 2 and a tubular cutter head 3, both of which are hollow along their axis to accommodate a tube 4 therein. The tube 4 immovably fits within the central hollow formed in the barrel 2 but is axially movable along the central hollow formed in the cutter head 3. The barrel 2 and the cutter head 3 are normally kept away from each other by means of a spring 5 which fits on the tube 4.

The lower end of a sleeve 6 is capped over the upper end of the barrel 2. The sleeve 6 serves as a cutting oil reservoir 7. For filling the cutting oil reservoir 7 with cutting oil, the cutting oil is poured thereinto through a cutting oil inlet 8 provided in the upper end of the sleeve 6.

The sleeve 6 may be made of a transparent material to give a visual indication of the oil level in the cutting oil reservoir 7.

The barrel 2 and the sleeve 6 may be of an integral structure.

A bolt 9 with a knurled head 10 is threaded into the cutting oil inlet 8. A groove 11 longitudinally provided in the threaded shank of the bolt 9 serves as an air hole when the bolt 9 is loosened. A packing ring 12 fits on the bolt 9 so that, when the bolt 9 is tightened, the gap between the knurled head 10 and the upper end of the sleeve 6 may be sealed.

A cutting blade 13 is rotatably mounted on the lower end of the cutter head 3.

A wick 14 fits closely in the tube 4. The upper and lower ends of the wick 14 project from the upper and lower ends of the tube 4, respectively. The lower end of the wick 14 is spaced from the cutting blade 13 as long as the barrel 2 and the cutter head 3 are kept away from each other by the spring 5. The lower end of the wick 14 comes in touch with the cutting blade 13 when the barrel 2 is pressed downwardly against the bias of the spring 5 and the tube 4 slides down in the hollow in the cutter head 3.

In the alternative, the tube 4 may be shorter than that shown in FIG. 3 so that a wider space may be left between the cutting blade 13 and the lower end of the wick 14, and a second wick adapted to be always in touch with the cutting blade 13 may be provided in the lower end of the cylindrical hollow formed in the cutter head 3. In this case, the lower end of the wick 14 comes in touch with the upper end of the second wick when the barrel 2 is pressed downwardly.

The rate of outflow of cutting oil through the lower end of the wick 14 can be adjusted by the rate of inflow of air into the cutting oil reservoir 7 through the groove 11.

The means for adjusting the rate of outflow of cutting oil through the lower end of the wick 14 may comprise a conventional regulating cock or the like.

A longitudinal indentation 15 provided in the external surface of the tube 4 in the cutter head 3 receives the tip of a setscrew 16 laterally into the cutter head 3. The axial movement of the cutter head 3 relative to the barrel 2 is limited to the length of the indentation 15.

In operation, the bolt 9 is loosened, the cutting blade 13 is applied to the plate glass, and the barrel 2 is pressed downwardly against the bias of the coil spring 5. The tube 4 will slide down in the cylindrical hollow formed in the cutter head 3. The tip of the wick 14 will come in touch with the cutting blade 13 as shown by the chain line in FIG. 3. Cutting oil, with which the wick 14 is impregnated, is applied to the cutting blade 13 and then to the plate glass. The line along which to cut the plate glass is thus smeared with cutting oil.

At the end of the cutting operation, the cutting blade 13 is detached from the plate glass, and the bolt 9 is tightened.

When the cutting blade 8 is detached from the plate glass, the resilience of the coil spring 5 causes the wick 4 to get out of touch with the cutting blade 13 and thereby prevents the cutting oil from trickling from the cutting blade 13 even when the glass cutter in accordance with the present invention is put, e.g., in a pocket.

While I have disclosed a preferred embodiment of the present invention, it is to be understood that it has been described by way of example only, various other modifications being obvious.

What I claim is:

1. A glass cutter comprising a tubular barrel, a sleeve serving as a cutting oil reservoir, the lower end of said sleeve being capped over the upper end of said barrel, a tubular cutter head coaxially provided under said barrel, a tube immovably fitting in a hollow formed in said barrel but being axially movably fitting in a hollow formed in said cutter head, a bolt threaded into the upper end of said sleeve, said bolt being provided with a longitudinal groove in the threaded shank thereof to admit air, means for resiliently connecting said cutter head to said barrel, a cutting blade provided at the lower end of said cutter head, and a wick fitting closely in said tube with the upper and lower ends of said wick projecting from the upper and lower ends of said tube, respectively, the lower end of said wick being normally spaced from said cutting blade as long as said barrel and said cutter head are kept away from each other by the bias of said means for resiliently connecting said cutter head to said barrel.

2. A glass cutter as set forth in claim 1, wherein said means for resiliently connecting said cutter head to said barrel comprises a spring fitting on said tube.

3. A glass cutter as set forth in claim 1, wherein a longitudinal indentation provided in the external surface of said tube in said cutter head receives the tip of a setscrew screwed laterally into said cutter head so that the axial movement of said cutter head relative to said barrel may be limited to the length of said indentation.

4. A glass cutter as set forth in claim 1, wherein said sleeve and said barrel are integral with each other.

* * * * *